Patented Apr. 10, 1951

2,548,652

UNITED STATES PATENT OFFICE 2,548,652

BETA HALO SUBSTITUTED PHENETHYL AMINES

Lee C. Cheney, Fayetteville, N. Y., assignor to Bristol Laboratories Inc., Syracuse, N. Y., a corporation of New York No Drawing. Application July 20, 1948, Serial No. 39,794

4 Claims. (Cl. 260—570.5)

This invention relates to a new class of chemical compounds of therapeutic value. The compounds may be represented by the following general formula:

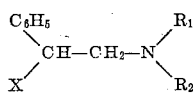

where X is halogen, $R_1$ is a member of the group hydrogen, alkyl, and benzyl, and $R_2$ is a member of the group benzyl and cyclohexyl, or $R_1$ and $R_2$ may be taken together to form a heterocyclic group such as piperidine, and morpholine.

These compounds may be obtained by treatment of the B-hydroxy-N,N-disubstituted phenethyl amine with a halogenating agent such as thionyl chloride. The hydroxyl function is replaced by chlorine and the hydrogen chloride generated thereby combines with the amine function to produce the amine salt.

In cases in which $R_1$ and $R_2$ are identical, or part of a ring structure as for example in piperidine, the aminoalcohols mentioned in the preceding paragraph are conveniently prepared by the reaction of styrene oxide with a secondary amine (Emerson, J. A. C. S. 67 (1945)).

In cases where $R_1$ and $R_2$ are different, the secondary aminoalcohol may be obtained from styrene oxide and a primary amine. Preparation of the tertiary aminoalcohol is accomplished by alkylation of the secondary aminoalcohol by the use of the desired halide according to standard procedures.

Alternatively, the secondary aminoalcohol may be converted to the corresponding B-chloro-N-substituted phenethyl amine, and this in turn alkylated to give the desired B-chloro-N,N-disubstituted phenethyl amine. The amine may be converted to its salt by standard procedures.

In this application the hydrochlorides of a number of B-chloro-N-substituted phenethyl amines are described. However, the invention is not limited to hydrochlorides, as other acids, inorganic or organic, may be employed to form the salts of the amines. Examples of such acids are sulfates, hydrobromides, and also organic acid addition salts such as the mucate, the tartrate and the citrate. The compounds of this invention possess sympatholytic activity, causing a fall in blood pressure or inhibiting the pressor action of epinephrine.

The following examples illustrate this invention, but it is to be understood that the invention is not limited to these examples.

EXAMPLE 1

*The preparation of B-chloro - N,N - dibenzylphenethyl amine hydrochloride*

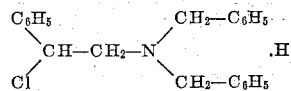

A mixture of 36 grams of styrene oxide and 79 grams of dibenzyl amine is refluxed for four hours, then distilled at 2.5 mm. There is obtained 68 grams (72% of theory) of B-hydroxy-N,N-dibenzylphenethyl amine, B. P. 212–216.5°.

A solution of 17.8 grams of thionyl chloride in 50 cc. of chloroform is added dropwise to a well-stirred solution of 39.6 grams of the above aminoalcohol in 100 cc. of chloroform. The resulting brown solution is refluxed for three hours, then the solvent stripped under reduced pressure. The residue is shaken with 10% sodium carbonate solution and ether, the ether layer removed and dried overnight with anhydrous potassium carbonate. After removal of the potassium carbonate by filtration, dry hydrogen chloride is passed into the ether solution. A dark greenish gum separates, which solidifies after decantation of the ether. Recrystallization of this material, first from acetone, then from a mixture of ethyl acetate, ethanol and ether, gives white crystals of B-chloro-N,N-dibenzylphenethyl amine hydrochloride, M. P. 155.0–156.0°.

Analysis:

| Calculated for $C_{22}H_{23}NCl_2$ | Calculated | Found |
|---|---|---|
| C | 71.0 | 71.0 |
| H | 6.2 | 6.4 |

EXAMPLE 2

*The preparation of B-chloro - N - cyclohexylphenethyl amine hydrochloride*

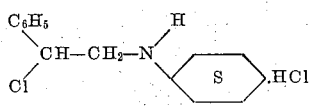

To 297 grams of cyclohexyl amine, stirred and maintained at 100° by external heating, is added over a period of four hours 328 grams of styrene oxide. The mixture is heated at 100° for two hours more. On standing overnight the reaction mixture solidifies. The material is triturated with Skellysolve A and then filtered. In this manner, 283 grams of B-hydroxy-N-cyclohexylphenethyl amine is obtained. Distillation of the mother liquors gives an additional 116 grams of the aminoalcohol, B. P. 147°/1 mm. (total yield 64% of theory). It may be recrystallized from Skellysolve A, giving white crystals, M. P. 89.0–90.0°.
Analysis:

| Calculated for $C_{14}H_{21}ON$ | Calculated | Found |
|---|---|---|
| C | 76.7 | 76.1 |
| H | 9.6 | 9.7 |
| N | 6.4 | 6.3 |

A benzene solution of 109 grams of this aminoalcohol is added dropwise to an ice-cold, well-stirred solution of 95 grams of thionyl chloride in 300 cc. of benzene. The mixture is then allowed to come to room temperature and stirring continued for three hours. The precipitate is collected by filtration, triturated with Skellysolve A and recrystallized from methyl isobutyl ketone. White crystalline B-chloro-N-cyclohexylphenethyl amine hydrochloride is obtained, M. P. 162.0–163.0° with softening at 150°.
Analysis:

| Calculated for $C_{14}H_{21}NCl_2$ | Calculated | Found |
|---|---|---|
| C | 61.3 | 61.4 |
| H | 7.7 | 7.8 |
| N | 5.1 | 5.2 |

EXAMPLE 3

*The preparation of B-chlorophenethylpiperidine hydrochloride*

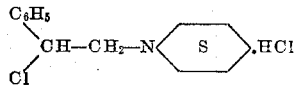

A mixture of 240 grams of styrene oxide and 227 grams of piperidine is warmed slightly, whereupon a vigorous exothermic reaction occurs. After an hours refluxing, the mixture is distilled at 1 mm., giving 364 grams (89% of theory) of B-hydroxyphenethyl piperidine, B. P. 120–123°. Recrystallization from Skellysolve A gives white crystals, M. P. 71.0–72.5°.
Analysis:

| Calculated for $C_{13}H_{19}ON$ | Calculated | Found |
|---|---|---|
| C | 76.1 | 75.9 |
| H | 9.3 | 9.2 |
| N | 6.8 | 6.9 |

A solution of 30.8 grams of this aminoalcohol in 150 cc. of ether is added dropwise to an ice-cold, well-stirred solution of 23.8 grams of thionyl chloride in 50 cc. of ether. The gummy yellow solid which precipitates out is collected by filtration and recrystallized from isopropanol, giving white crystals of B-chlorophenethyl piperidine hydrochloride, M. P. 171.5–172.5°.
Analysis:

| Calculated for $C_{13}H_{19}NCl_2$ | Calculated | Found |
|---|---|---|
| C | 60.0 | 59.7 |
| H | 7.4 | 7.7 |
| N | 5.4 | 5.2 |

EXAMPLE 4

*The preparation of B-chloro-N-cyclohexyl-N-benzylphenethyl amine hydrochloride*

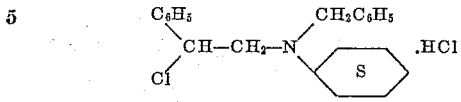

In a manner similar to that described above, B - hydroxy - N - cyclohexyl - N - benzylphenethylamine is prepared from B-hydroxy-N-cyclohexyl-phenethyl amine and benzyl chloride. It is a yellow oil boiling at 184–187°/1 mm.

A solution of 12 grams of thionyl chloride in 50 cc. of ether is added dropwise to an ice-cold, well-stirred solution of 16 grams of the above tertiary aminoalcohol in 150 cc. of ether. The mixture is allowed to come to room temperature and finally refluxed for one hour. Evaporation of the solvent under reduced pressure leaves a brown amorphous residue, which is dissolved in warm benzene and again evaporated to dryness under reduced pressure. Recrystallization of the residue from a mixture of ethyl acetate, ethanol and ether gives white crystals of B-chloro-N-cyclohexyl-N-benzylphenethyl amine hydrochloride, M. P. 161.0–162.0°.
Analysis:

| Calculated for $C_{21}H_{27}NCl_2$ | Calculated | Found |
|---|---|---|
| C | 69.2 | 69.5 |
| H | 7.5 | 7.2 |

EXAMPLE 5

*The preparation of B-chloro-N-isopropyl-N-benzylphenethyl amine hydrochloride*

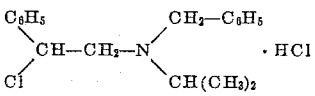

A mixture of 60 grams of styrene oxide and 45 grams of isopropyl amine is allowed to stand at room temperature in a stoppered flask for two weeks. After addition of 20 cc. of Skellysolve A, the solid material is collected by filtration, giving 64 grams (71% of theory) of B-hydroxy-N-isopropylphenethyl amine. Recrystallization from cyclohexane-Skellysolve A gives white crystals, M. P. 90.8–91.0°.
Analysis:

| Calculated for $C_{11}H_{17}ON$ | Calculated | Found |
|---|---|---|
| C | 73.7 | 73.8 |
| H | 9.6 | 9.6 |
| N | 7.8 | 8.3 |

To a refluxing solution of 54 grams of this secondary aminoalcohol in 150 cc. of benzene is added 19 grams of benzyl chloride. Refluxing is continued for 18 hours. Dilution of the chilled mixture with 700 cc. of ether causes precipitation of the hydrochloride of the starting secondary aminoalcohol, which is removed by filtration. The filtrate is washed several times with water, shaken with saturated sodium chloride solution and filtered through anhydrous potassium carbonate. After removal of the solvent, the residual oil is distilled giving 33 grams (82% of theory) of B-hydroxy-N-isopropyl-N-benzylphenethyl amine, B. P. 207–209°/1 mm.

Analysis:

| Calculated for C₁₈H₂₃ON | Calculated | Found |
|---|---|---|
| C | 80.3 | 80.4 |
| H | 8.6 | 8.6 |
| N | 5.2 | 5.1 |

A solution of 12.9 grams of thionyl chloride in 25 cc. of ethyl acetate is added dropwise to a stirred solution of 26.5 grams of the above tertiary aminoalcohol in 150 cc. of ethyl acetate. The mixture is refluxed ten minutes, then the solvent evaporated under reduced pressure. Recrystallization of the residual tan gum from a mixture of ethyl acetate, isopropanol and ether gives B-chloro-N-isopropyl-N-benzylphenethyl amine hydrochloride. M. P. 155.0–156.0°.

Analysis:

| Calculated for C₁₈H₂₃NCl₃ | Calculated | Found |
|---|---|---|
| C | 66.7 | 66.8 |
| H | 7.2 | 7.5 |
| N | 4.3 | 4.0 |

What I claim is:

1. A new class of compounds consisting of the free base and salts thereof, said free base having the general formula:

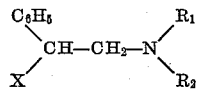

where X is halogen; R₁ represents a member of the group consisting of hydrogen, lower alkyl and benzyl; R₂ is a member of the group consisting of benzyl and cyclohexyl; and R₁ and R₂ taken together with the nitrogen atom represent a member of the group consisting of piperidino and morpholino.

2. Compound of the class consisting of a free base and salts thereof, said free base having the following formula

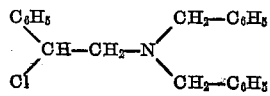

3. Compound of the class consisting of a free base and salts thereof, said free base having the following formula

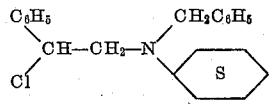

4. Compound of the class consisting of a free base and salts thereof, said free base having the following formula

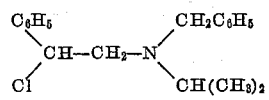

LEE C. CHENEY.

REFERENCES CITED

The following references are of record in the file of this patent:

UNITED STATES PATENTS

| Number | Name | Date |
|---|---|---|
| 2,408,345 | Shelton et al. | Sept. 24, 1946 |

OTHER REFERENCES

Fischer: "Ber. deut. chem.," vol. 29, pp. 205–214 (1896).

Wolfheim: "Ber. deut. chem.," vol. 47, pp. 1440–1452 (1914).

Gabriel et al.: "Ber. deut. chem.," vol. 47, pp. 1866–1873 (1914).

Schmidt: "Chem. Ab.," vol. 8, p. 3779 (1915).

Emde: "Chem. Ab.," vol. 23, pp. 3453–3454 (1929).

Freundlich et al.: Z. physik. Chem.," vol. A166, pp. 179–204 (1933).

Menshikov et al.: "Chem. Ab.," vol. 39, p. 1172 (1945).

Hunt: J. Pharm. Exp. Therapy, vol. 95, pp. 177–184 (1949).